(12) United States Patent
Croitoru et al.

(10) Patent No.: US 9,219,664 B2
(45) Date of Patent: Dec. 22, 2015

(54) METHODS, SYSTEMS, AND COMPUTER READABLE MEDIA FOR HANDLING UNEXPECTED VIRTUAL STATION INTERFACE (VSI) DISCOVERY AND CONFIGURATION PROTOCOL (VDP) PACKETS RECEIVED BY A VSI

(71) Applicant: Ixia, Calabasas, CA (US)

(72) Inventors: Dan-Alexandru Croitoru, Bucharest (RO); Mihai Neagu, Pitești (RO); Codruţ Dumitru Rădoi, București (RO)

(73) Assignee: Ixia, Calabasas, CA (US)

( * ) Notice: Subject to any disclaimer, the term of this patent is extended or adjusted under 35 U.S.C. 154(b) by 160 days.

(21) Appl. No.: 14/154,166

(22) Filed: Jan. 13, 2014

(65) Prior Publication Data

US 2015/0200823 A1 Jul. 16, 2015

(30) Foreign Application Priority Data

Jan. 10, 2014 (RO) .................................... 14-00010

(51) Int. Cl.
| | |
|---|---|
| H04L 12/26 | (2006.01) |
| H04L 12/931 | (2013.01) |
| H04L 12/46 | (2006.01) |
| H04L 12/24 | (2006.01) |

(52) U.S. Cl.
CPC .......... *H04L 43/062* (2013.01); *H04L 12/4625* (2013.01); *H04L 41/12* (2013.01); *H04L 49/70* (2013.01)

(58) Field of Classification Search
None
See application file for complete search history.

(56) References Cited

U.S. PATENT DOCUMENTS

| 6,538,988 B1* | 3/2003 | Natarajan et al. ............. 370/216 |
| 2012/0063306 A1* | 3/2012 | Sultan et al. .................. 370/230 |
| 2015/0139037 A1* | 5/2015 | Li et al. ......................... 370/255 |

OTHER PUBLICATIONS

IEEE 802.1 Qbg, Feb. 18, 2012, IEEE Draft Standard, p. 1-187.*
"MAC Bridges and Virtual Bridged Local Area Networks—Amendment XX: Edge Virtual Bridging," Draft Standard for Local and Metropolitan Area Networks, IEEE, P802.1Qbg/D2.2, pp. 1-187 (Feb. 18, 2012).

* cited by examiner

*Primary Examiner* — Ian N Moore
*Assistant Examiner* — Lakeram Jangbahadur
(74) *Attorney, Agent, or Firm* — Jenkins, Wilson, Taylor & Hunt, P.A.

(57) ABSTRACT

Methods, systems, and computer readable media for handling unexpected virtual station interface (VSI) discovery and configuration protocol (VDP) packets received by a VSI are disclosed. One method includes, at a network equipment test device, emulating an ER and VSIs behind the ER. The method further includes transmitting a keep-alive message for a session from one of the VSIs to a virtual Ethernet port aggregation (VEPA) bridge under test. The method further includes receiving a de-associate message from the bridge, tearing down the session, and attempting to re-establish the session with the bridge. The method further includes, while waiting to initiate the attempt to re-establish the session with the bridge, receiving an unexpected message from the bridge and intercepting and logging receipt of the at least one unexpected message.

18 Claims, 7 Drawing Sheets

METHODS, SYSTEMS, AND COMPUTER READABLE MEDIA FOR HANDLING UNEXPECTED VIRTUAL STATION INTERFACE (VSI) DISCOVERY AND CONFIGURATION PROTOCOL (VDP) PACKETS RECEIVED BY A VSI

PRIORITY CLAIM

This application claims the benefit of Romanian Patent Application No. A/00010/2014, filed Jan. 10, 2014; the disclosure of which is incorporated herein by reference in its entirety.

TECHNICAL FIELD

The subject matter described herein relates to testing Ethernet bridges. More particularly, the subject matter described herein relates to methods, systems, and computer readable media for handling unexpected virtual station interface (VSI) discovery and configuration protocol (VDP) packets received by a VSI.

BACKGROUND

Virtual machines are software implementations of physical machines. Virtual machines are often used so that the resources of a single physical computer can be shared among many virtual computers. Each virtual machine may include virtual hardware resources, such as virtual disks, virtual processing resources, and virtual network interface cards. When multiple virtual machines share the same physical Ethernet port, this is referred to as virtual Ethernet port aggregation or VEPA. VEPA has been standardized as IEEE 802.1Qbg—Edge Virtual Bridging, Draft 2.2, 28 Mar. 2012 (hereinafter, "EVB Standard"), the disclosure of which is incorporated herein by reference in its entirety. According to the EVB Standard, an edge relay (ER) is virtual layer 2 switch used by multiple virtual machines to share the same physical Ethernet port. An edge relay can operate in VEPA mode or virtual Ethernet bridging (VEB) mode. Each virtual machine includes a virtual station interface (VSI) that connects the virtual machine to an ER. If a VM connected to an ER operating in VEPA mode desires to send packets to another VM connected to the same ER, the EVB Standard requires that the packet be sent out of the physical Ethernet port, to an adjacent bridge, and back to the VM via the ER. The adjacent bridge is required to build VEPA forwarding tables so that packets will be transmitted correctly between VMs. If the ER is operating in VEB mode, packets can be sent between VSIs connected to the same ER without requiring that the packets be sent to the adjacent bridge.

It is desirable to test the functionality of Ethernet bridges that implement VEPA. One aspect of testing the functionality of VEPA Ethernet bridges is testing the Ethernet bridges' implementation of the VDP protocol. The VDP protocol is used to discover and configure a VSI instance. It has been determined that in some instances, the VEPA Ethernet bridge sends unexpected packets to ERs. These unexpected packets can cause the state machines of the VSIs to crash or enter unexpected states. For example, when a user instructs a VEPA Ethernet bridge to clear all existing sessions, the bridge may initiate transmission of de-associate messages for all sessions. Transmission of some of the de-associate messages may be delayed due to finite resources of the bridge or buffering mechanisms. While waiting to transmit a de-associate message for a session, the bridge may receive a keep-alive message for the same session from one of the VSIs. The bridge may incorrectly interpret the keep-alive message as a message for a new session and may send subsequent messages for the session that the bridge incorrectly interprets as a new session to the VSI. The VSI may subsequently receive the de-associate message, clear the session, and place the session in a retry queue to wait behind other sessions and attempt reestablishment of the session. While waiting to retry establishment of the session, the VSI does not expect to receive new session messages from the bridge. Receipt of such messages while waiting to retry the session causes the station, i.e., the VSI, to enter an indeterminate state.

Accordingly, there exists a need for methods, systems, and computer readable media for handling unexpected VDP packets received by a VSI.

SUMMARY

Methods, systems, and computer readable media for handling unexpected virtual station interface (VSI) discovery and configuration protocol (VDP) packets received by an edge relay (ER) are disclosed. One method includes, at a network equipment test device, emulating an ER and a plurality of VSIs located behind the ER. The method further includes transmitting a keep-alive message from one of the VSIs to a virtual Ethernet port aggregation (VEPA) bridge under test. The method further includes receiving a de-associate message from the bridge, tearing down the session, and attempting to re-establish the session with the bridge. The method further includes, while waiting to initiate the attempt to re-establish the session with the bridge, receiving an unexpected message from the bridge and intercepting and logging receipt of the at least one unexpected message.

The subject matter described herein can be implemented in hardware or hardware in combination with software and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
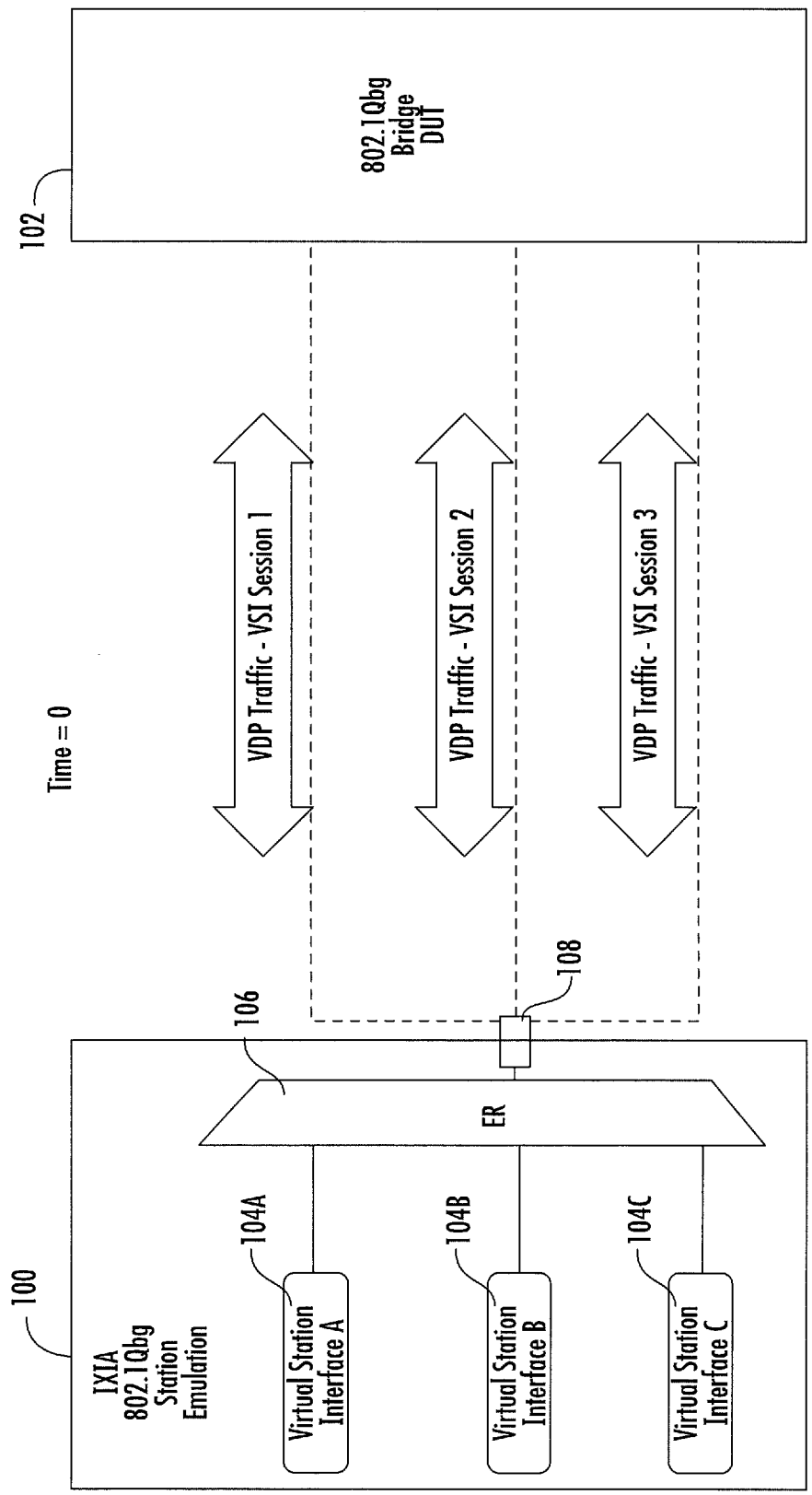
FIG. 1 is a network diagram illustrating a network equipment test device emulating an ER and plural VSI sessions to test the functionality of a VEPA Ethernet bridge according to an embodiment of the subject matter described herein.

Methods, systems, and computer readable media for handling unexpected VDP packets received by an ER are disclosed. FIG. 1 is a network diagram illustrating a network equipment test device emulating an ER and plural VSIs for testing a VEPA Ethernet bridge according to an embodiment of the subject matter described herein. Referring to FIG. 1, network equipment test device 100 communicates with a VEPA bridge 102 over one or more VSI sessions. In the illustrated example, network equipment test device 100 emulates virtual station interfaces 104A, 104B, and 104C and edge relay (ER) 106. ER 106 forwards packets between VSIs 104A-104C and to DUT 102 via physical network interface 108. ER 106 may operate in VEPA mode or VEB mode, as described above. Although in the illustrated example, one ER, three VSI interfaces and three corresponding sessions are illustrated, in practice, network equipment test device 100 may emulate more than one ER, hundreds of VSIs and thousands of simultaneous sessions to test the performance of VEPA Ethernet bridge 102. Each virtual station interface 104A, 104B, and 104C may implement the VDP state machine as specified by the EVB Standard.

Figure 2:
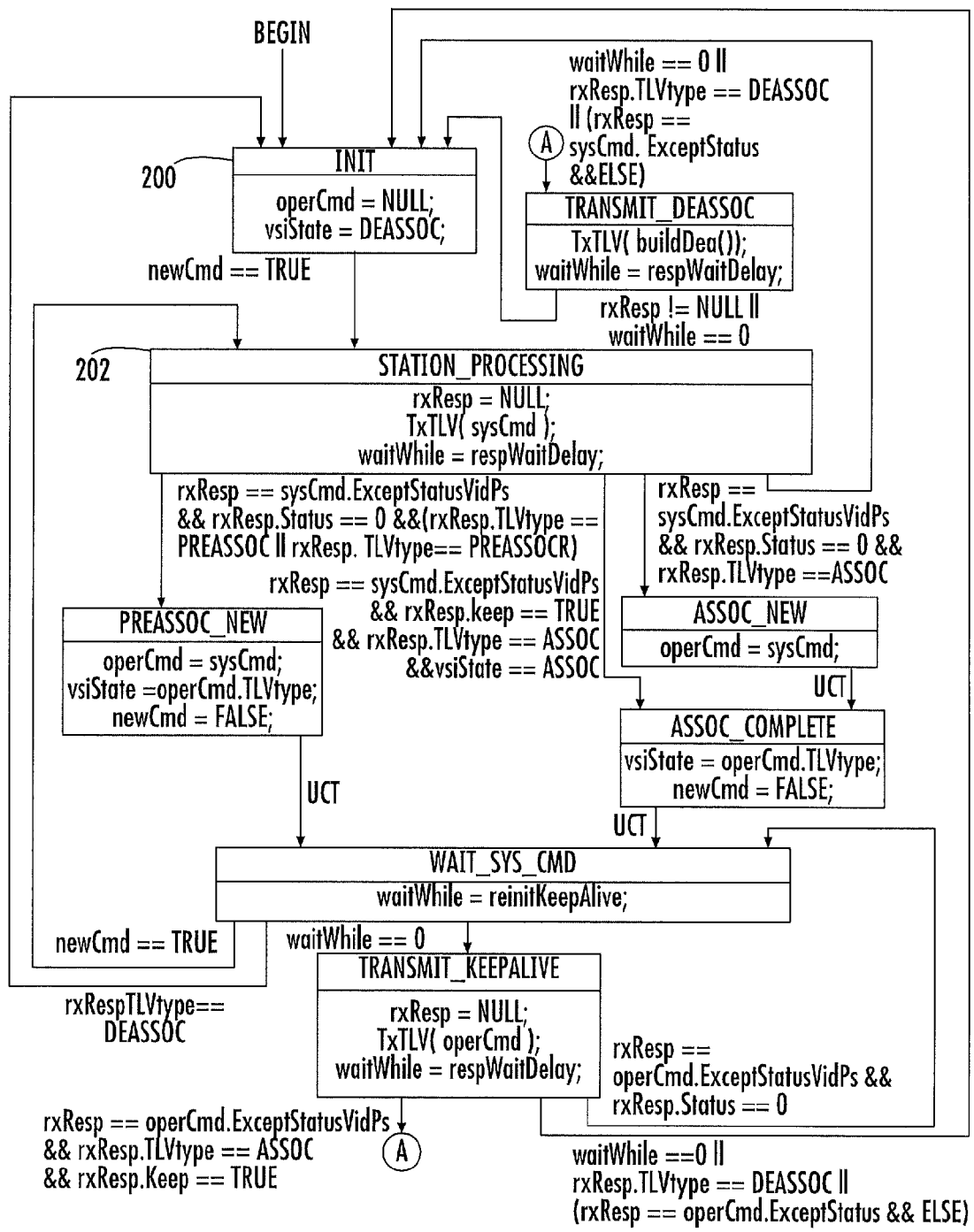
FIG. 2 is a state diagram illustrating the 802.1Qbg station VDP state machine, as specified by the EVB standard.

FIG. 2 illustrates the 802.1Qbg station VDP state machine. In FIG. 2, a VSI begins the VDP processing in the INIT state 200. In the INIT state, if the station receives or issues a new command, the state machine proceeds to the STATION_PROCESSING state 202. If the station receives an unexpected command in the STATION_PROCESSING state 202, there is no mechanism in the present state machine for intercepting the command, even if the command is not an expected command. In addition, there is no mechanism in the current state machine for logging receipt of the command. Improvements to the state machine will be described in detail below.

Figure 3:
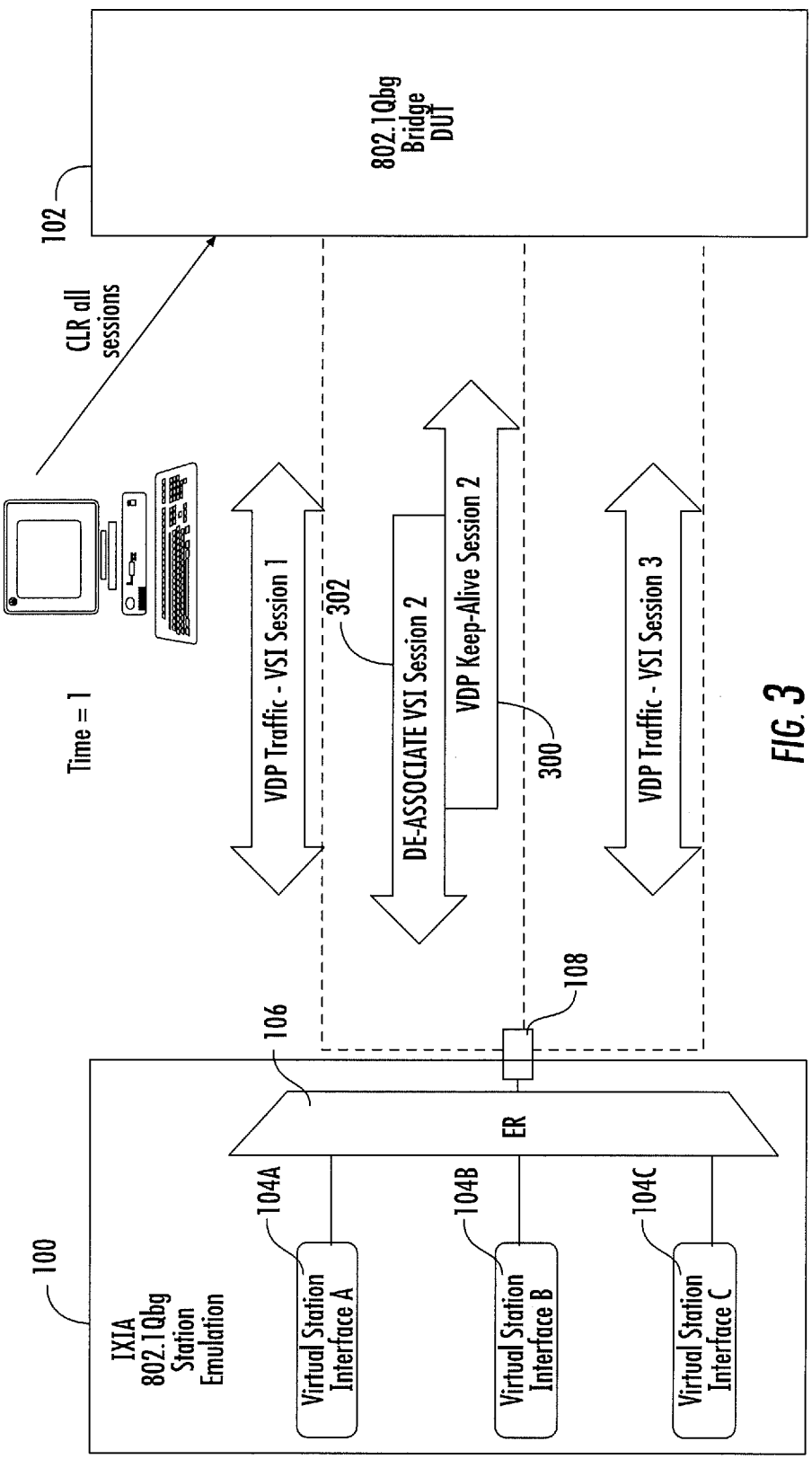
FIG. 3 is a network diagram illustrating exemplary traffic exchanged between VSIs and a VEPA Ethernet bridge.

FIG. 3 is a network diagram illustrating a problem that can occur with the 802.1Qbg bridge implementation. In FIG. 3, bridge 102 receives a clear all sessions command from the user. The result of the clear all sessions command is for the bridge to transmit de-associate messages to network equipment test device 100. However, the process of transmitting de-associate messages involves placing the messages in a transmit queue of bridge 102 to be transmitted to ER 106 and ultimately to the VSIs located behind ER 106. Because there may be some delay in transmitting these messages, other messages for the sessions may be transmitted by the VSIs behind ER 106 before the VSIs receive the de-associate message. In the illustrated example, VSI 104B located behind ER 106 transmits a VDP keep-alive message 300 to bridge 102. The de-associate message 302 generated by bridge 102 is eventually transmitted to VSI 104B. The de-associate message 302 transmitted by bridge 102 and the keep-alive message 300 transmitted by VSI 104B located behind ER 106 cross in the air between bridge 102 and ER 106.

Figure 4:
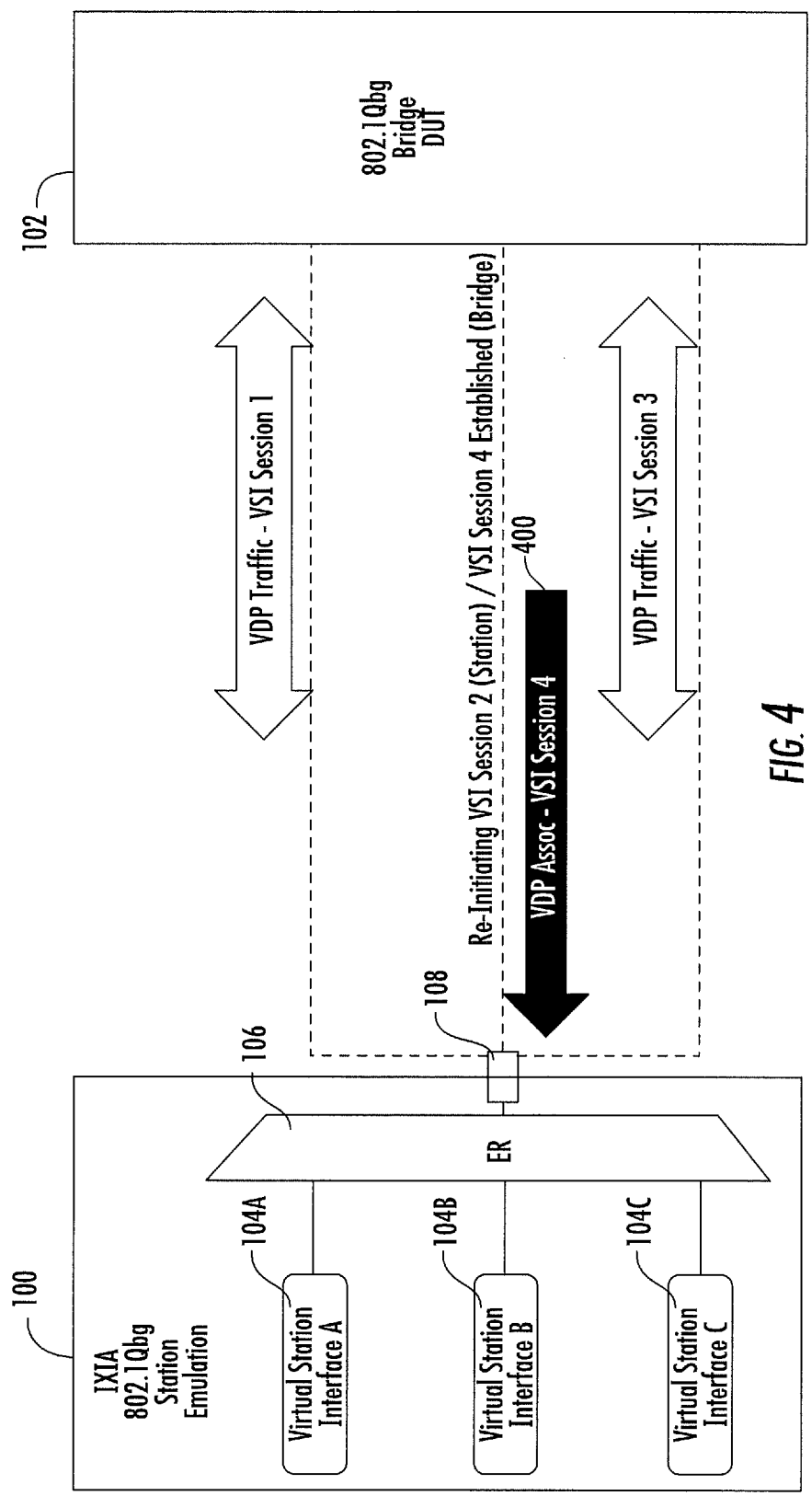
FIG. 4 is a network diagram illustrating receipt of unexpected messages by an emulated VSI according to an embodiment of the subject matter described herein.

Referring to FIG. 4, when bridge 102 receives the keep-alive message, bridge 102 incorrectly interprets the keep-alive message as being associated with a new session. VSI 104B receives the de-associate message and interprets the de-associate message as being a session termination message 300. Accordingly, VSI 104B enters the INIT state and the session is torn down. Because the retry mechanism is active, the session goes into the outstanding queue and waits for other sessions to negotiate so it can also reinitiate the negotiation process.

After one to three seconds from the initial session clear command, because of buffering and temporization features on bridge 102, bridge 102 replies to the keep-alive message with an associate message 400 for a new session. As set forth in the preceding paragraph, VSI 104B is in the INIT state where the session is in the outstanding queue still waiting to transmit an associate message when VSI 104B receives associate message 400 transmitted in error by bridge 102. Associate message 400 received from bridge 102 is unexpected. In response to receiving the unexpected associate packet, VSI 104B may go into an indeterminate state and may remain in that state. However, according to improvement herein, VSI 104B continues to wait to send its associate message but this wait may take longer than a configured session timeout, typically a number of seconds, because of a slow renegotiation rate caused by buffering or throttling mechanisms. After configured session timeout of seconds expires, a timeout occurs on bridge 102 for the pseudo active session, so bridge 102 terminates the connection by sending a de-associate message. In response to receiving the de-associate packet, VSI 104B goes into an indeterminate state and may remain in that state.

Figure 5:
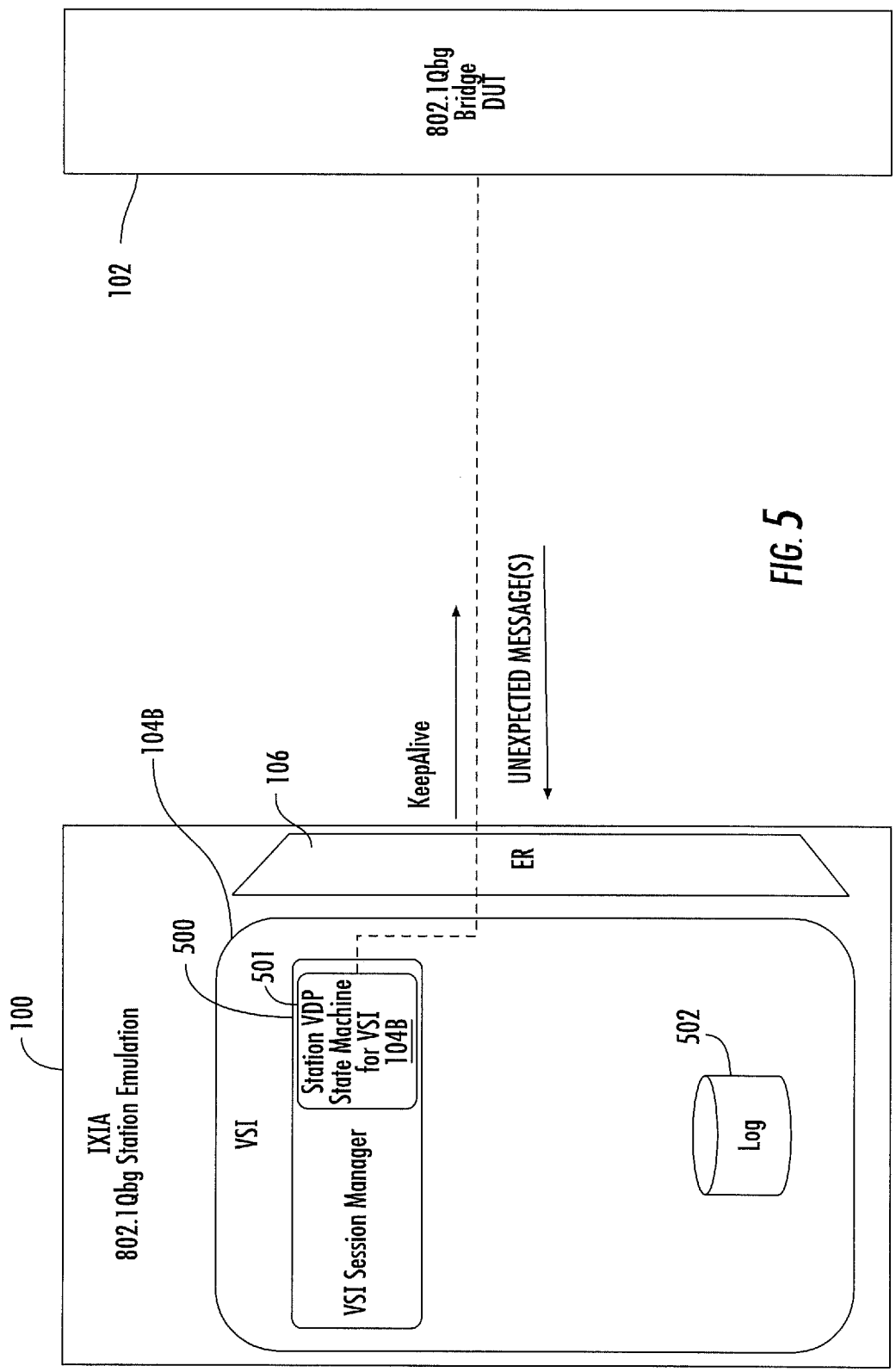
FIG. 5 is a block diagram illustrating an emulated VSI configured to intercept and process unexpected traffic from a VEPA bridge under test according to an embodiment of the subject matter described herein.

Rather than acting on unexpected messages transmitted by bridge 102 in response to a keep-alive message, virtual station interfaces 104A through 104C may intercept and log such messages so that the performance of bridge 102 can be accurately recorded and tested. FIG. 5 is a diagram illustrating an exemplary network equipment test device with the capability of intercepting and logging unexpected VDP messages received in response to a keep-alive message according to an embodiment of the subject matter described herein. In FIG. 5, VSI 104B is shown for simplicity. It is understood that multiple VSIs may be implemented as shown and described herein. Referring to FIG. 5, VSI 104B implements or includes a VSI session manager 500 that implements a modified version 501 of the VDP state machine illustrated in FIG. 2, which intercepts unexpected messages and logs the occurrence of unexpected messages in a log 502.

Figure 6:
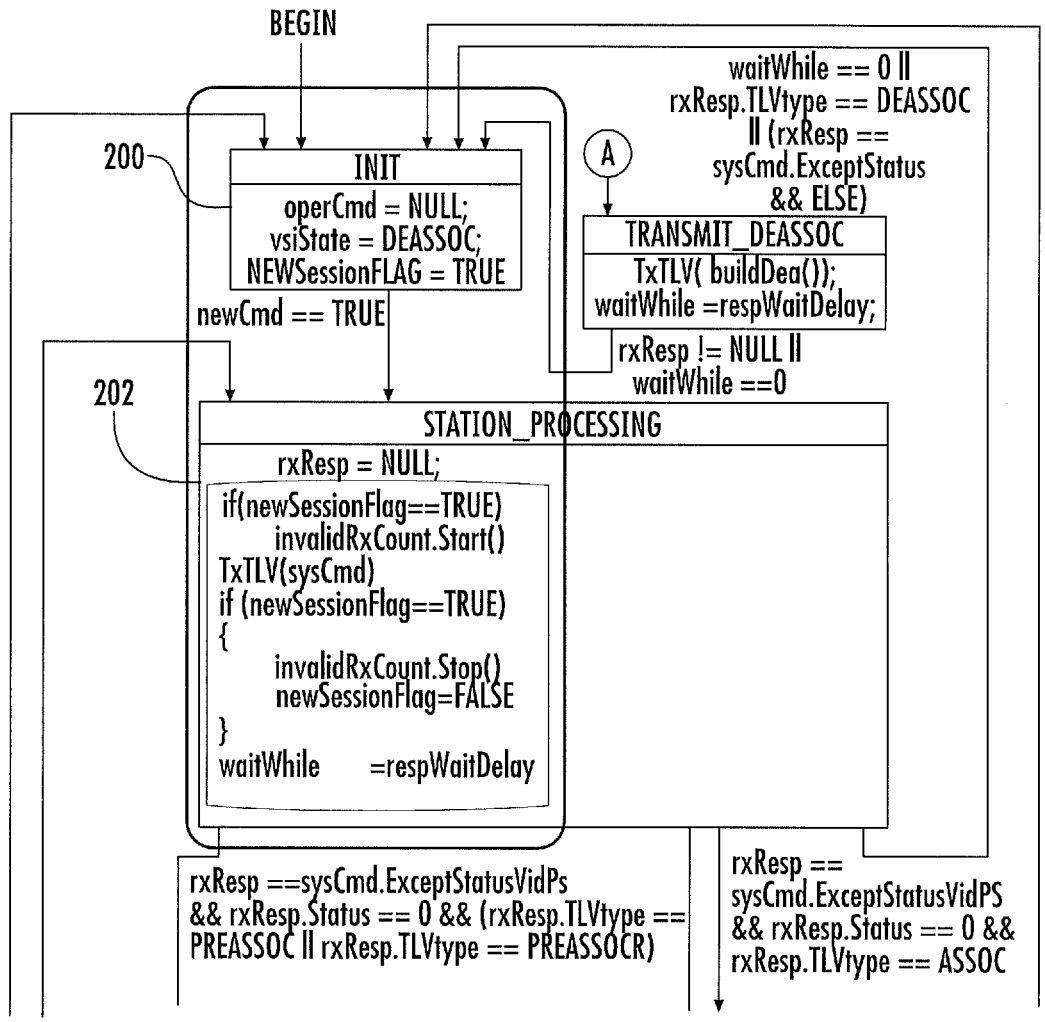
FIG. 6 is a state diagram illustrating modifications to the 802.1Qbg station VDP state machine to facilitate intercepting and logging of unexpected messages received by a VSI according to an embodiment of the subject matter described herein.

FIG. 6 illustrates a portion of modified VDP state machine 501 that may be implemented by VSI session manager 500. VSI session manager 500 may implement the modified states illustrated in FIG. 6 and the remaining states illustrated in FIG. 2 of the VDP state machine. Referring to FIG. 6, in INIT state 200, a Boolean variable called newSessionFlag is set to TRUE. In STATION_PROCESSING state 202, the newSessionFlag variable is checked to determine whether it is set to TRUE. If the newSessionFlag is set to TRUE, the STATION_PROCESSING state 202 executes a new function, invalidRxCount.start( ) that intercepts and logs receipt of unexpected messages while waiting for VSI 104B to transmit a command to bridge 102. VSI 104B may transmit a command to bridge 102, for example, upon receiving notification that its associated VM has data to send to bridge 102. Once VSI 104B transmits the command to bridge 102, the counting stops and the newSessionFlag is set to FALSE. The pseudo code shown below illustrates the changes in the INIT and STATION PROCESSING states.

INIT state changes to:
    operCmd=NULL
    vsiState=DEASSOC
    newSessionFlag=TRUE STATION_PROCESSING state changes to:

```
rxResp       = NULL
if (newSessionFlag == TRUE)
      invalidRxCount.Start( )
TxTLV(sysCmd)
if (newSessionFlag == TRUE)
{
      invalidRxCount.Stop( )
      newSessionFlag = FALSE
}
waitWhile    = respWaitDelay
```

Thus, in FIG. 5, when the keep-alive message sent by VSI 104B is improperly interpreted as being associated with a new session by bridge 102 and bridge 102 transmits one or more invalid responses to VSI 104B, the invalid responses may be intercepted, counted, and records of receipt of the invalid responses may be stored in log 502. Thus, the invalid responses do not cause the state machine of VSI 104B to enter an invalid state or stay hung in a particular state.

Figure 7:
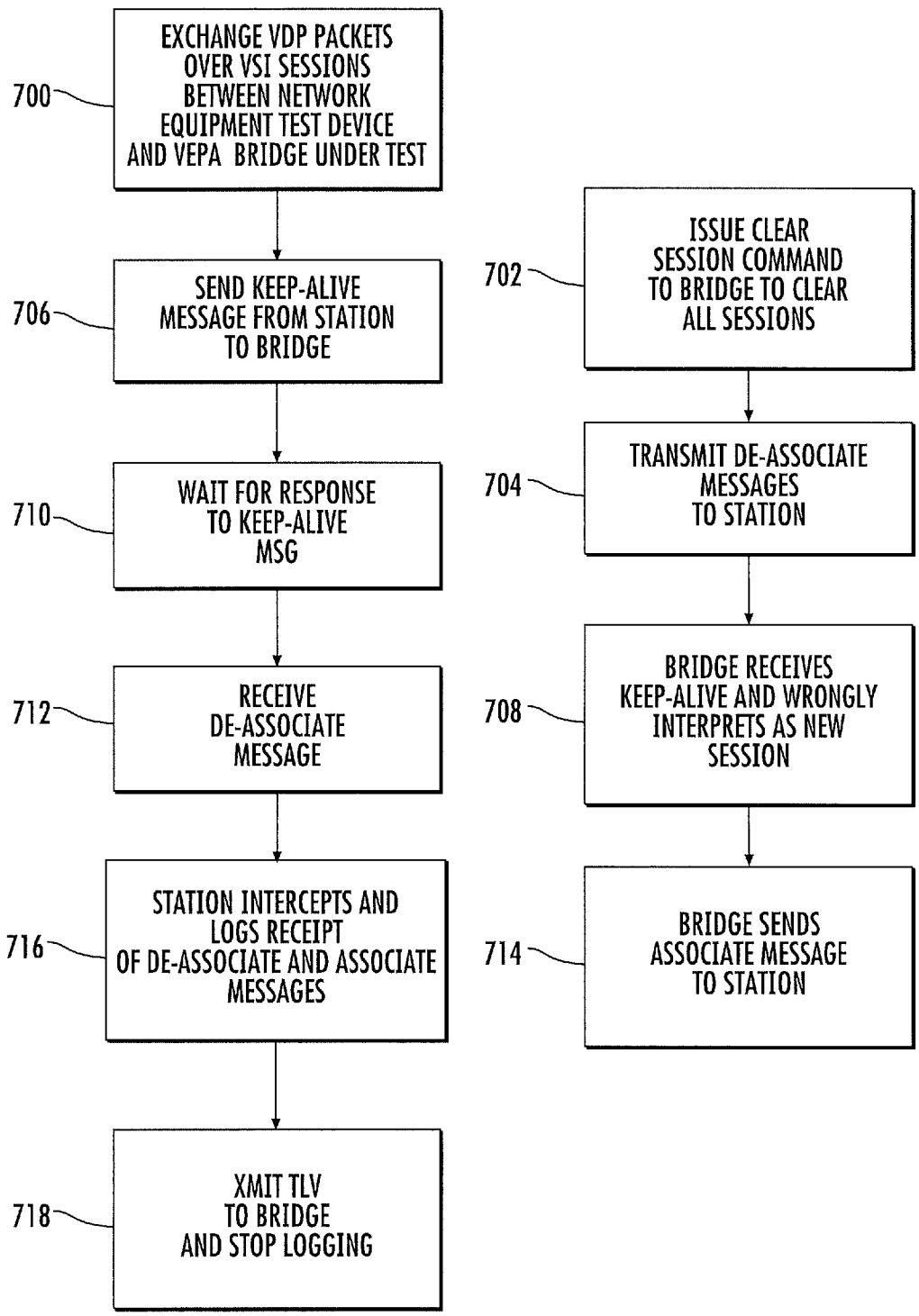
FIG. 7 is a flow chart illustrating an exemplary process for handling unexpected VDP traffic by a VSI according to an embodiment of the subject matter described herein.

FIG. 7 is a flow chart illustrating exemplary steps for handling unexpected packets by a VSI's VDP state machine in response to transmission of such packets by a bridge. The flow chart in FIG. 7 is divided into two parts. The left-hand side of the flow chart illustrates steps performed by the VSI's VDP state machine. The right-hand side of the flow chart illustrates steps performed by the bridge. Referring to FIG. 7, in step 700, the VSIs exchange VDP packets with the bridge over VSI sessions. For example, network equipment test device 100 may emulate hundreds or thousands of VSIs to test the functionality of bridge 102. The VSIs establish sessions with the bridge and sends VDP traffic over the sessions.

In step 702, the user issues a clear session command to the bridge to clear all existing sessions. The clear session command results in the transmission of de-associate messages to the VSIs, as indicated in step 704. However, there may be some delay in transmitting the de-associate messages to the VSIs. While the bridge is waiting for responses to the de-associate messages, the station sends a keep-alive message to the bridge, as indicated by step 706. In step 708, the bridge receives the keep-alive message and wrongly interprets the keep-alive message as a new session. Meanwhile, in step 710, the station is still waiting for a response to the keep-alive message. In step 712, the station receives the de-associate message, interprets the de-associate message as a response to the keep-alive message and tears down the session. The station places the session in the outstanding queue and waits for other sessions to negotiate so the station can also renegotiate the session.

In step 714, the bridge sends an associate message to the station. The associate message is sent in response to the keep-alive message transmitted to the bridge in step 706. From the station's viewpoint, the associate message is unexpected because the session is in the outstanding queue still waiting to transmit the associate message to the bridge. However, rather than entering an indeterminate state as before, as illustrated in the pseudo code above and in FIG. 6, from the INIT state, a flag called newSessionFlag is set to TRUE and the state machine transitions to the STATION PROCESSING state. In the STATION_PROCESSING state, the function invalidRxCount( ) starts intercepting and counting unexpected messages (step 716). The VSI transmits an associate message to the bridge in an attempt to reestablish the session. While waiting for the associate command to be transmitted from the station, any invalid messages received from the bridge are intercepted and counted. Once the associate message has been transmitted, as indicated by step 718, the station stops counting unexpected packets and resets the newSessionFlag variable. Thus, using the modified station VDP state machine illustrated in FIG. 6 and the pseudo code above, a network equipment test device that emulates ERs and associated VSIs is prevented from being put in an unexpected state due to some errors in bridge state machine implementations.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for handling unexpected virtual station interface (VSI) discovery and configuration protocol (VDP) packets received by a VSI, the method comprising:
   at a network equipment test device:
      emulating an edge relay (ER) and a plurality of VSIs behind the ER;
      sending VDP traffic regarding sessions involving the VSIs from the VSIs, through the ER, and to a virtual Ethernet port aggregation (VEPA) bridge under test;
      sending, from one of the VSIs, a keep-alive message for a session involving the VSI;
      receiving a de-associate message from the bridge, tearing down the session, and attempting to re-establish the session with the bridge;
      while waiting to initiate the attempt to re-establish the session with the bridge: receiving at least one unexpected message from the bridge; and intercepting and logging receipt of the at least one unexpected message;
      wherein intercepting at least one unexpected message includes preventing the at least one unexpected message from causing a state machine error on the VSI.

2. The method of claim 1 wherein receiving the at least one unexpected message from the bridge includes receiving a VDP associate message from the bridge.

3. The method of claim 1 wherein attempting to re-establish the session with the bridge includes preparing an associate command to send to the bridge.

4. The method of claim 3 comprising stopping the logging and interception of unexpected messages in response to transmitting the associate command to the bridge.

5. The method of claim 1 wherein the network equipment test device is configured to emulate a plurality of IEEE 802.1Qbg VSIs.

6. The method of claim 5 wherein the 802.1Qbg VSIs each implements an 802.1Qbg station VDP state machine modified to have at least one state for counting and logging receipt of the at least one unexpected message.

7. A system for handling unexpected virtual station interface (VSI) discovery and configuration protocol (VDP) packets received by a VSI, the system comprising: a network equipment test device configured to emulate an edge relay (ER) and a plurality of VSIs behind the ER, each of which is configured to send VDP traffic to and receive VDP traffic from a virtual Ethernet port aggregation (VEPA) bridge under test, the network equipment device including:
   a VDP manager associated with one of the VSIs and configured to:
      send, from one of the VSIs, a keep-alive message for a session;

receive a de-associate message from the bridge, tear down the session and attempt to re-establish the session with the bridge;

and while attempting to re-establish the session with the bridge:

receive at least one unexpected message from the bridge; and intercept and log receipt of the at least one unexpected message;

wherein the VDP manager is configured to intercept the at least one unexpected message by preventing the at least one unexpected message from causing a state machine error on the VSI.

8. The system of claim 7 wherein the at least one unexpected message from the bridge comprises a VDP associate message from the bridge.

9. The system of claim 7 wherein the VDP manager is configured to attempt to re-establish the session with the bridge includes by preparing an associate message to send to the bridge.

10. The system of claim 9 wherein the VDP manager is configured to stop the logging and interception of unexpected messages in response to transmitting the associate message to the bridge.

11. The system of claim 7 wherein the network equipment test device is configured to emulate a plurality of IEEE 802.1Qbg VSIs.

12. The system of claim 11 wherein the 802.1Qbg VSIs each implements an 802.1Qbg station VDP state machine modified to have at least one state for counting and logging receipt of the at least one unexpected message.

13. A non-transitory computer-readable medium having stored thereon executable instructions that when executed by the processor of a computer control the computer to perform steps comprising: at a network equipment test device:

emulating an edge relay (ER) and plurality of virtual station interfaces (VSIs) located behind the ER;

sending VSI discovery protocol (VDP) traffic from a plurality of VSIs over VSI sessions to a virtual Ethernet port aggregation (VEPA) bridge under test;

sending, from one of the VSIs, a keep-alive message for a session;

receiving a de-associate message from the bridge, tearing down the session, and attempting to re-establish the session with the bridge;

while waiting to initiate the attempt to re-establish the session with the bridge:

receiving at least one unexpected message from the bridge; and intercepting and logging receipt of the at least one unexpected message;

wherein intercepting at least one unexpected message includes preventing the at least one unexpected message from causing a state machine error on the VSI.

14. The non-transitory computer-readable medium of claim 13 wherein receiving at least one unexpected message from the bridge includes receiving a VDP associate message from the bridge.

15. The non-transitory computer-readable medium of claim 13 wherein attempting to re-establish the session with the bridge includes preparing an associate command to send to the bridge.

16. The non-transitory computer-readable medium of claim 13 comprising stopping the logging and interception of unexpected messages in response to transmitting the associate command to the bridge.

17. The non-transitory computer readable medium of claim 13 wherein the network equipment test device is configured to emulate a plurality of IEEE 802.1Qbg VSIs.

18. The non-transitory computer readable medium of claim 17 wherein the 802.1Qbg VSIs each implement an 802.1Qbg station VDP state machine modified to have at least one state for counting and logging receipt of the at least one unexpected message.

* * * * *